US011281217B2

(12) United States Patent
Herman et al.

(10) Patent No.: US 11,281,217 B2
(45) Date of Patent: Mar. 22, 2022

(54) ENHANCED VEHICLE OPERATION

(71) Applicant: Ford Global Technologies, LLC, Dearborn, MI (US)

(72) Inventors: David Michael Herman, Oak Park, MI (US); Daniel A. Makled, Dearborn, MI (US); Michael Mcquillen, Warren, MI (US); Ashwin Arunmozhi, Canton, MI (US); Michael Adel Awad Alla, Novi, MI (US); Ray Siciak, Ann Arbor, MI (US); Bo Wu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 190 days.

(21) Appl. No.: 16/452,122

(22) Filed: Jun. 25, 2019

(65) Prior Publication Data

US 2020/0409361 A1  Dec. 31, 2020

(51) Int. Cl.
G05D 1/00 (2006.01)
B60W 20/13 (2016.01)
G05D 1/02 (2020.01)
B60W 50/00 (2006.01)

(52) U.S. Cl.
CPC ........... G05D 1/0088 (2013.01); B60W 20/13 (2016.01); G05D 1/0217 (2013.01); B60W 2050/0005 (2013.01); B60W 2556/50 (2020.02); G05D 2201/0212 (2013.01)

(58) Field of Classification Search
CPC .............. G05D 1/0088; G05D 1/0217; G05D 2201/0212; B60W 20/13; B60W 2556/50; B60W 2050/0005; G06Q 10/0631; G06Q 30/0645; G06Q 50/30
See application file for complete search history.

(56) References Cited

U.S. PATENT DOCUMENTS

| 7,865,298 B2 | 1/2011 | Macneille et al. |
| 9,429,943 B2 | 8/2016 | Wilson et al. |
| 9,720,415 B2 | 8/2017 | Levinson et al. |
| 9,805,605 B2 | 10/2017 | Ramanujam |
| 9,958,864 B2 | 5/2018 | Kentley-Klay et al. |
| 10,025,899 B2 | 7/2018 | Tarte et al. |
| 10,222,799 B2 | 3/2019 | Goldberg et al. |

(Continued)

FOREIGN PATENT DOCUMENTS

| JP | 2013086529 A | 5/2013 | |
| WO | WO-2017207982 A1 * | 12/2017 | .............. B60L 50/61 |
| WO | 2019013948 A1 | 1/2019 | |

OTHER PUBLICATIONS

De Baker et al., "Solving Vehicle Routing Problems using Constraint Programming and Metaheuristics", Journal of Heuristics, vol. 1-16 (1997).

(Continued)

Primary Examiner — Hunter B Lonsberry
Assistant Examiner — Jimin You
(74) Attorney, Agent, or Firm — Frank A. MacKenzie; Bejin Bieneman PLC

(57) ABSTRACT

A computer includes a processor and a memory, the memory storing instructions executable by the processor to predict a user arrival time based on data of a user and a user origin location, deactivate a propulsion of the vehicle upon arriving at the user origin location, and deactivate one or more additional vehicle components based on the user arrival time.

17 Claims, 6 Drawing Sheets

(56) References Cited

U.S. PATENT DOCUMENTS

| | | | |
|---|---|---|---|
| 2012/0095622 A1* | 4/2012 | Lynch | B64C 25/00 701/3 |
| 2015/0175010 A1* | 6/2015 | Tang | H02P 29/032 701/22 |
| 2016/0092741 A1* | 3/2016 | Li | H04N 5/2256 382/103 |
| 2016/0125735 A1 | 5/2016 | Tuukkanen | |
| 2018/0057006 A1 | 3/2018 | Seki et al. | |
| 2018/0113448 A1* | 4/2018 | Nagda | G05D 1/0293 |
| 2018/0141427 A1* | 5/2018 | Katayama | B60W 10/06 |
| 2018/0141562 A1 | 5/2018 | Singhal | |
| 2018/0186357 A1* | 7/2018 | Deshpande | B60W 10/08 |
| 2018/0342157 A1* | 11/2018 | Donnelly | G08G 1/0137 |
| 2019/0041855 A1* | 2/2019 | Suzuki | B60R 25/25 |

OTHER PUBLICATIONS

Eksioglu et al., "The vehicle routing problem: A taxonomic review", Computers & Industrial Engineering 57 (2009) 1472-1483.
Shaw, "Using Constraint Programming and Local Search Methods to Solve Vehicle Routing Problems", Department of Computer Science, University of Strathclyde, Glasgow, Apr. 1998.

* cited by examiner

ENHANCED VEHICLE OPERATION

BACKGROUND

Vehicles can use a battery and an internal combustion engine to power vehicle components, including, e.g., a powertrain, a steering rack, etc. For example, sensors that collect data while operating, including radar, LIDAR, vision systems, infrared systems, and ultrasonic transducers, consume energy from the battery.

DETAILED DESCRIPTION

Figure 1:
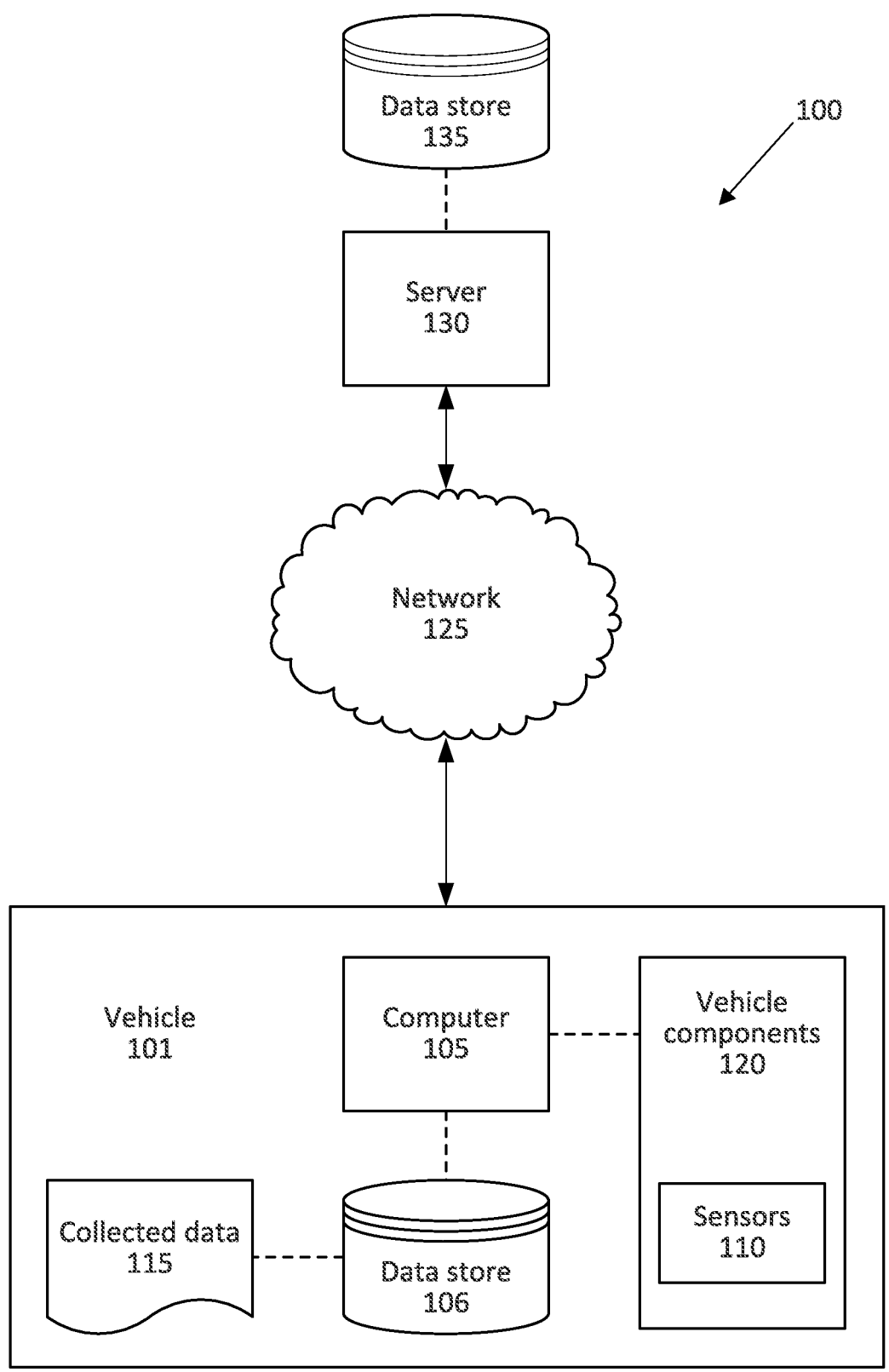
FIG. 1 is a diagram of an example system for operating an example vehicle.

A computer includes a processor and a memory, the memory storing instructions executable by the processor to predict a user arrival time based on data of a user and a user origin location, deactivate a propulsion a vehicle upon arriving at the user origin location, and deactivate one or more additional vehicle components based on the user arrival time.

The instructions can further include instructions to deactivate one or more sensors having a data collection range exceeding a distance threshold from the vehicle when the user arrival time exceeds a time threshold.

The instructions can further include instructions to reduce data collection of one or more sensors upon deactivating the propulsion.

The instructions can further include instructions to predict a state of charge of a battery of the vehicle at the user arrival time and to deactivate one or more components based on the predicted state of charge.

The instructions can further include instructions to identify a user destination location and to assign one of a plurality of vehicles to transport the user from the user origin location to the user destination location based on the user arrival time.

The instructions can further include instructions to identify a remote sensor and a type of data collected by the remote sensor and to deactivate one or more sensors that collect the same type of data.

The instructions can further include instructions to identify a number of objects within a distance threshold of the vehicle and to deactivate the one or more components when the number of objects is below a threshold.

The instructions can further include instructions to identify a route for the vehicle to the user origin location that actuates a combustion engine to increase a state of charge of a battery above a charge threshold upon arriving at the user origin location.

The instructions can further include instructions to predict the user arrival time based on previous user arrival times for the user.

The instructions can further include instructions to determine the user arrival time based on weather data at the user origin location.

The instructions can further include instructions to determine the user arrival time based on a type of facility located at the user origin location.

The instructions can further include instructions to identify a user cargo load and to predict the user arrival time based on the user cargo load.

The instructions can further include instructions to suppress deactivation of the propulsion when the vehicle is stopped en route to the user origin location.

The instructions can further include instructions to determine the user arrival time based on a number of users requested to be transported.

The instructions can further include instructions to provide power to one or more vehicle components on a vehicle power network having a wire with a lower resistance than a second wire in a second vehicle power network.

The instructions can further include instructions to predict the user arrival time based on a predicted user entry time.

A method includes predicting a user arrival time based on data of a user and a user origin location, deactivating a propulsion of a vehicle upon arriving at the user origin location, and deactivating one or more additional vehicle components based on the user arrival time.

The method can further include deactivating one or more sensors having a data collection range exceeding a distance threshold from the vehicle when the user arrival time exceeds a time threshold.

The method can further include reducing data collection of one or more sensors upon deactivating the propulsion.

The method can further include predicting a state of charge of a battery of the vehicle at the user arrival time and deactivating one or more components based on the predicted state of charge.

The method can further include identifying a user destination location and assigning one of a plurality of vehicles to transport the user from the user origin location to the user destination location based on the user arrival time.

The method can further include identifying a remote sensor and a type of data collected by the remote sensor and deactivating one or more sensors that collect the same type of data.

The method can further include identifying a number of objects within a distance threshold of the vehicle and deactivating the one or more components when the number of objects is below a threshold.

The method can further include identifying a route for the vehicle to the user origin location that actuates a combustion engine to increase a state of charge of a battery above a charge threshold upon arriving at the user origin location.

The method can further include predicting the user arrival time based on previous user arrival times for the user.

The method can further include determining the user arrival time based on weather data at the user origin location.

The method can further include determining the user arrival time based on a type of facility located at the user origin location.

The method can further include identifying a user cargo load and to predict the user arrival time based on the user cargo load.

The method can further include suppressing deactivation of the propulsion when the vehicle is stopped en route to the user origin location.

The method can further include determining the user arrival time based on a number of users requested to be transported.

The method can further include providing power to one or more vehicle components on a vehicle power network having a wire with a lower resistance than a second wire in a second vehicle power network.

The method can further include predicting the user arrival time based on a predicted user entry time.

A system includes a vehicle component, means for predicting a user arrival time based on data of a user and a user origin location, means for deactivating a propulsion of a vehicle upon arriving at the user origin location, and means for deactivating the vehicle component based on the user arrival time.

The system can further include means for deactivating one or more sensors having a data collection range exceeding a distance threshold from the vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

When a vehicle is stationary, a computer can deactivate a propulsion, and can in this event power components with a vehicle battery. The battery has a limited amount of charge and the components can consume the charge while the propulsion is deactivated. To reduce power consumption of the battery, the computer can deactivate or adjust operation of one or more components while the propulsion is deactivated. The computer can determine one or more components to deactivate based on a predicted arrival time of a user to the vehicle. That is, by predicting the user arrival time, the computer can predict when the propulsion will be reactivated and can reduce power consumption of the battery until the user arrives at the vehicle. Thus, power consumption of limited amount of charge of the battery can be reduced. Upon reactivation of the vehicle, an internal combustion engine of the propulsion can recharge the battery while the vehicle transports the user to a destination.

FIG. 1 illustrates an example system 100 for operating a vehicle 101. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle propulsion, braking, and steering are controlled by the computer 105. A semi-autonomous mode is one in which at least one of vehicle propulsion, braking, and steering are controlled at least partly by the computer 105 as opposed to a human operator. In a non-autonomous mode, i.e., a manual mode, the vehicle propulsion, braking, and steering are controlled by the human operator.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a cleaning component, a park assist component, an adaptive cruise control component, an adaptive steering component, a movable seat, or the like. For the avoidance of doubt, note that the components 120 further include the sensors 110; the sensors 110 are identified with a separate reference numeral herein for convenience, e.g., some of the following discussion of sensors 110 involves sensing capabilities, etc., and does not pertain to other components 120.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
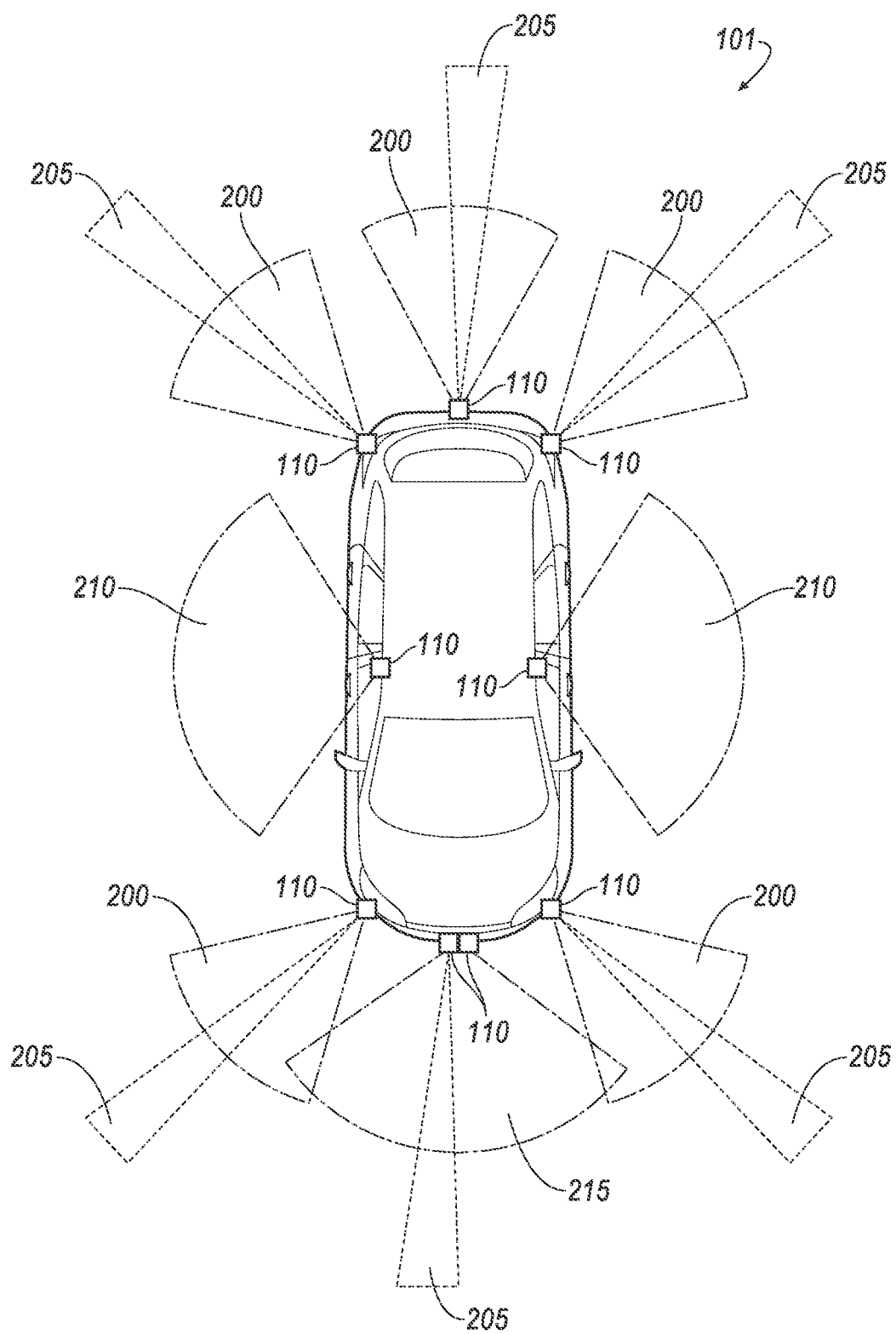
FIG. 2 is a plan view of the example vehicle showing ranges of sensors.

FIG. 2 is a plan view of an example vehicle 101 with a plurality of sensors 110. Each sensor 110 has, within its field of view, a respective data collection range, i.e., a distance from which the sensor 110 can collect data 115, based on a type of the sensor 110, i.e., a classification of the sensor based on the data 115 collected by the sensor 110 and/or the manner in which the data 115 are collected. For example, a radar sensor 110 can have a short radar range 200 of 100 meters and a long radar range 205 of 250 meters, a camera 110 can have a camera range 210 of 50 meters, a LIDAR sensor 110 can have a LIDAR range 215 of 20 meters, an ultrasonic sensor 110 (not shown in FIG. 2) can have an ultrasonic range of 5 meters, and an interior camera 110 (not shown in FIG. 2) in a passenger cabin of the vehicle can have a range of 2 meters.

The vehicle 101 is operable in an idle mode. In the idle mode, the computer 105 deactivates a propulsion 120 and operates the components 120 with the vehicle 101 battery. The computer 105 operates the vehicle 101 in the idle mode when the vehicle 101 is not moving, i.e., the vehicle 101 is idling. The idle mode reduces fuel consumed by the propulsion 120 while the vehicle 101 is not moving. Because the components 120 are powered by the battery in the idle mode, the computer 105 can deactivate one or more components 120 to reduce power consumption. As described above, the components 120 include the sensors 110. That is, the computer 105 can deactivate one or more sensors 110 in the idle mode to reduce power consumption. Alternatively or additionally, the computer 105 can operate components 120 on a vehicle power network having wires having lower resistance than another vehicle power network, e.g., the vehicle power network having wires with larger gauge size, to reduce resistance of the current flowing through the vehicle power network and reduce power loss of the current over the vehicle power network. That is, because power loss in a circuit is proportional to the resistance of the circuit, reducing the resistance of wires in the vehicle power network reduces power loss of current through the vehicle power network. The computer 105 can provide power to one or more components 120 on a first vehicle power network having a wire with a lower resistance than a second wire in a second vehicle power network.

The computer 105 can actuate the idle mode when the vehicle 101 is waiting for a user at a user origin location. A "user origin location" is a location at which user input specifies to rendezvous with the vehicle 101. When the vehicle 101 waits for a user, the vehicle 101 is not moving and does not require the propulsion 120 to propel the vehicle 101. To reduce fuel consumption, the computer 105 can actuate the idle mode while waiting for the user. When the user arrives at the user origin location, the computer 105 can reactivate the propulsion 120 to receive the user.

The user can transmit the user origin location and a user destination location to the server 130 and/or the computer 105 over the network 125. The vehicle 101 can move the user from the user origin location to the user destination location. After transmitting the user origin location to the server 130 and/or the computer 105, the computer 105 can actuate components 120 to move the vehicle 101 to the user origin location. The vehicle 101 can arrive at the user origin location prior to the user. That is, the user can identify the user origin location as a different location than a current location of the user, and the user may require time to move to the user origin location. The predicted time that the user will arrive at the user origin location is a "user arrival time." That is, the user arrival time indicates a predicted time that the user will arrive at the user origin location after requesting the vehicle 101. The user arrival time may differ from a request time from the user, i.e., the user may underestimate an expected amount of time for the user to arrive at the user origin location. The user arrival time can be an integer value of a time period, e.g., 15 minutes, and the computer 105 can determine a clock time (10:15 AM) corresponding to the user arrival time by adding a current time (e.g., 10:00 AM) and the user arrival time (15 minutes).

The computer 105 can predict the user arrival time based on, e.g., previous user arrival times of the user, ambient weather conditions, features of the user origin location that can delay the user, etc. For example, the computer 105 can, upon receiving a request for a vehicle 101 at the user origin location, predict the user arrival time as an average of previous user arrival times for the user at the origin location. In another example, the computer 105 can determine ambient weather at the user origin location and/or the current user location and increase the user arrival time when the ambient weather includes one or more weather conditions that can delay the user, e.g., rain, snow, wind, etc. For example, the computer 105 can include a lookup table that provides a multiplier to increase the user arrival time, e.g., if the computer 105 detects rain, the computer 105 can multiply a predicted user arrival time by 1.20. Example multipliers include, e.g., 1.30 for snow, 1.15 for winds between 10-20 kph, 1.30 for winds between 20-40 kph, etc. In another example, the computer 105 can predict the user arrival time based on a type of facility located at the user origin location. In this context, a "type of facility" is a classification of a facility according to features of the facility that can indicate change in the user arrival time. Example types of facilities include, e.g., airports, shopping malls, municipal buildings, transportation stations, etc. For example, if the user origin location is an airport, the computer 105 can refer to a lookup table that increases the predicted user arrival time to account for delays that can be caused by airport security and/or baggage collection. For example, the computer 105 can increase the user arrival time by 30 minutes when the user origin location is an airport. In another example, the computer 105 can increase the user arrival time by 15 minutes with the user origin location is a mall to account for user traffic. As described below, the computer 105 can predict the user arrival time and deactivate one or more components 120 based on the predicted user arrival time to reduce energy consumption.

Figure 3:
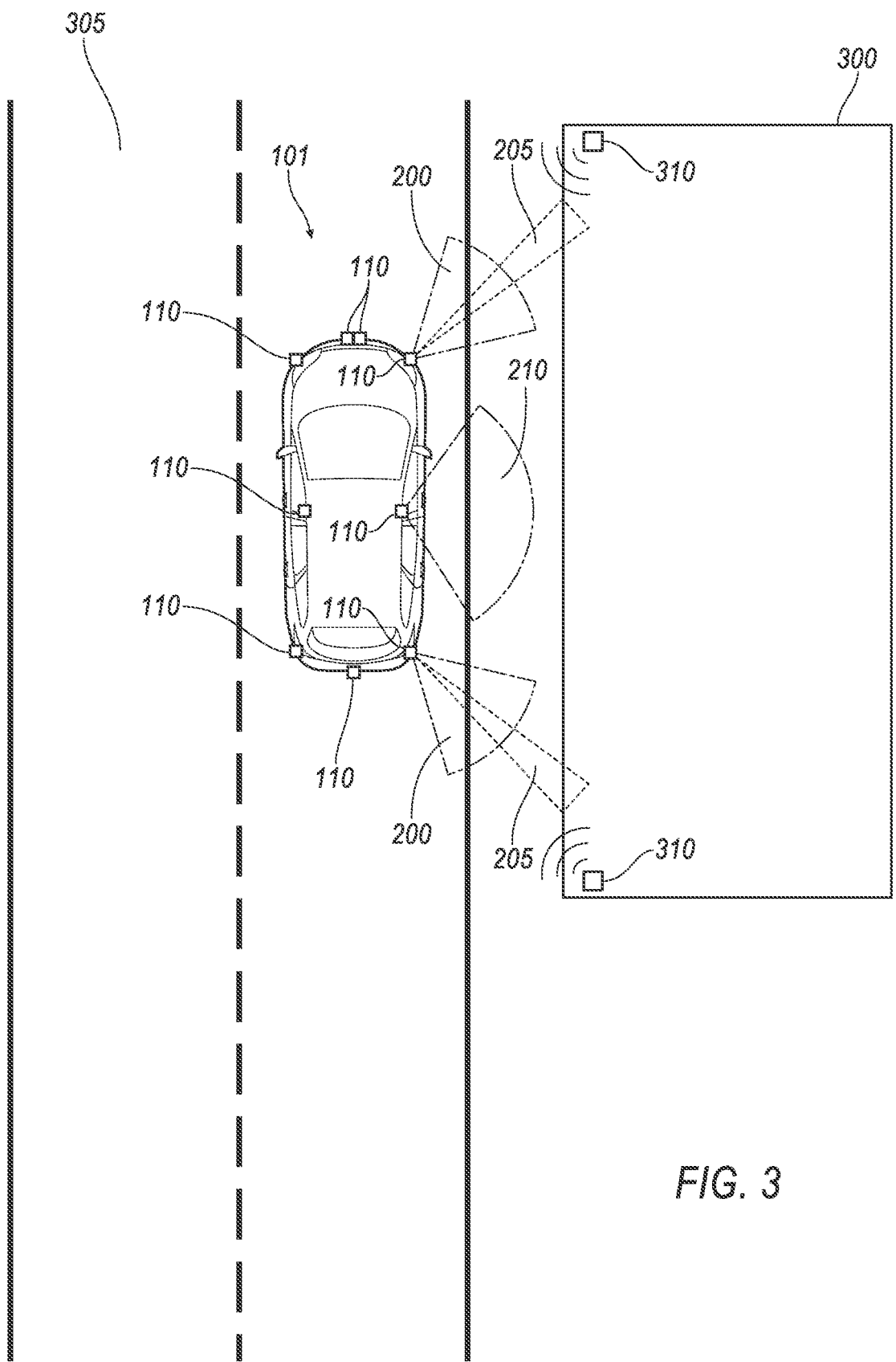
FIG. 3 is a plan view of the example vehicle at a user origin location.

FIG. 3 is a plan view of an example vehicle 101 idling at the user origin location. While the vehicle 101 idles, the computer 105 can actuate the idle mode and deactivate the propulsion 120. To reduce power consumption of the battery, the computer 105 can deactivate one or more sensors 110 that may not be necessary while the vehicle 101 is idling. That is, the computer 105 can deactivate one or more sensors 110 having data collection ranges exceeding a distance threshold from the vehicle 101 when the user arrival time exceeds a time threshold. The distance threshold can be a distance between the vehicle 101 and the user origin location, e.g., 5 meters. For example, as described above, the vehicle 101 can include ultrasonic sensors 110, radar sensors 110, and lidar sensors 110. Each of the sensors 110 has a specific range and field of view in which to collect data 115, e.g., the radar sensors 110 can have a range of 100-250 meters, the lidar sensors 110 can have a range of 20 meters, and the ultrasonic sensors 110 can have a range of 5 meters. The computer 105 can deactivate the radar sensors 110 and the lidar sensors 110 that have ranges greater than 5 meters to reduce power consumption. The time threshold can be determined as an amount of time until the state of charge of the battery reaches a charge threshold, e.g., 0%, 10%, etc. The charge threshold can be an amount of charge required to reactivate the propulsion 120 and/or an amount of charge to prevent degradation of the battery.

When the vehicle 101 is idling (i.e., in idle mode) near a facility 300 at the user origin location, the computer 105 can determine to deactivate sensors 110 with ranges and/or fields of view extending into an adjacent roadway lane 305 because the computer 105 would not actuate the vehicle 101 to move into the adjacent roadway lane prior to the user arrival time. For example, the computer 105 can deactivate lidar sensors 110 having a range of 20 meters while maintaining ultrasonic sensors 110 having a range of 5 meters.

The computer 105 can predict a state of charge of the battery. That is, the computer 105 can determine a current state of charge of the battery and predict the state of charge of the battery at a specific future time based on power consumption of the sensors 110. For example, the computer 105 can determine that the current state of charge of the battery is 75% and that the power consumption of the sensors 110 is 1% per minute. Thus, the computer 105 can predict the state of charge of the battery at a future time of 20 minutes as 55%. In another example, the computer 105 can predict the state of charge of the battery based on ambient temperature. The computer 105 can refer to a lookup table or correlation algorithm or the like that provides a predicted power consumption for a specific ambient temperature determined by, e.g., a temperature sensor, weather data 115 from the server 130, etc.

The computer 105 can predict a first state of charge of the battery upon arrival of the vehicle 101 at the user origin location and a second state of charge of the battery at the user arrival time. Upon receiving the request to meet the user, the computer 105 can predict an amount of time to reach the user origin location and predict a first state of charge of the battery that is the state of charge upon arriving at the user origin location. The computer 105 can determine a second amount of time between the arrival time of the vehicle 101 and the user arrival time when the user arrives at the user origin location. The computer 105 can predict a second state of charge of the battery based on the second amount of time. If the second state of charge is below a charge threshold, the computer 105 can determine to deactivate one or more sensors 110 and/or components 120 to reduce power consumption in the idle mode. The charge threshold can be a state of charge required to reactivate the vehicle 101 into the active mode as described below, e.g., 10%. Alternatively or additionally, the computer 105 can determine a difference between the first state of charge and the second state of charge. If the difference is greater than a difference threshold, the computer 105 can deactivate one or more sensors 110 and/or components 120 to reduce power consumption in the idle mode. The difference threshold can be a predicted amount of charge restored to the battery by the internal combustion engine in the active mode when the vehicle 101 moves from the user origin location to the user destination location, e.g., 25%.

The computer 105 can reduce computations performed by the sensors 110 to reduce power consumption. Each of the sensors 110 can collect data 115 at specific collection rates and resolutions that consume power when subject to computations by the computer 105. Each sensor 110 may also collect different types of data 115. A "type of data" is a classification of the specific kind of data 115 collected by the sensor 110, e.g., color image data 115 and grayscale image data 115. The computer 105 can adjust the data collection rate by the sensors 110 upon deactivating the propulsion 120 to reduce computations and reduce power consumption. For example, the computer 105 can instruct one or more lidar sensors 110 to collect data 115 at a slower rate, e.g., 50% of the rate collected while the vehicle 101 is in motion. In another example, the computer 105 can instruct one or more cameras 110 to collect images 115 in grayscale, which can require fewer computations and memory space, than in full red-green-blue (RGB) color. In yet another example, the computer 105 can adjust image signal processing (ISP) settings to reduce computations required for color determination and other image processing of images 115 collected by the cameras 110.

The computer 105 can deactivate one or more sensors 110 and/or reduce computations performed by one or more sensors 110 based on a priority of the sensors 110. The "priority" of sensors 110 is a list stored in the data store 106 and/or the server 130 that indicates an order to maintain operation of specific sensors 110 based on the state of charge of the battery at the user arrival time. The priority can be a value between 0 and 1. For example, a first camera 110, e.g., facing a curb, can have a priority of 0.8, a second camera 110, e.g., facing a roadway, can have a priority of 0.5, and a lidar 110 can have a priority of 0.1. Based on the priority and the predicted state of charge of the battery at the user arrival time, the computer 105 can deactivate one or more sensor 110 and/or reduce computations of the sensors 110. For example, Table 1 shows operation of example sensors 110 at predicted state of charges of the battery at the user arrival time:

TABLE 1

| Predicted State of Charge | LIDAR Operation (p = 0.1) | Camera Operation (p = 0.8) | Camera Operation (p = 0.5) |
| --- | --- | --- | --- |
| 90% | Off | 25 Hz | 5 Hz |
| 70% | Off | 22 Hz | 1 Hz |
| 50% | Off | 18 Hz | Off | where p is the priority, and the "operation" is the rate of data 115 collection by the specific sensor 110 in Hertz (Hz). That is, at a predicted state of charge of the battery of 70%, the computer 105 will deactivate the lidar 110, operate the first camera 110 at 22 Hz, and operate the second camera 110 at 1 Hz. By reducing operation of the sensors 110 according to the priority, the computer 105 can reduce power consumption of the battery.

The computer 105 can determine a risk level of the user origin location and actuate one or more sensors 110 based on the risk level. In this context, a "risk level" is a classification of a number and type of objects near the vehicle 101 that can require the computer 105 to actuate sensors 110 and/or components 120. A "type of object" is a classification of the object based on characteristics unique to the object, e.g., pedestrians, other vehicles 101, bicycles, etc. The risk level is a natural number, e.g., 1, 2, etc. Based on the risk level, the computer 105 can deactivate one or more sensors 110 and/or components 120 to reduce power consumption in the idle mode, as described below. The computer 105 can determine the risk level based on a number of objects within a distance threshold of the vehicle 101. That is, each risk level has a corresponding threshold number of objects, and the computer 105 can deactivate one or more sensors 110 and/or components 120 when the detected number of objects is below one of the thresholds. The distance threshold can be a distance within which the objects are able to interact with the vehicle 101, e.g., 3 meters. Each risk level can correspond to specific operation of sensors 110 and/or components 120. For example, the computer 105 can refer to a stored lookup table or the like such as Table 2 below:

TABLE 2

| Number of Objects Detected | Risk Level | Camera Operation |
|---|---|---|
| >20 | 1 | 25 Hz |
| 15-20 | 2 | 22 Hz |
| 10-14 | 3 | 20 Hz |
| 0-9 | 4 | 15 Hz |

Alternatively or additionally, the computer 105 can determine the risk level based on a number and a type of objects detected. For example, a risk level of 1 can correspond to 10 or more pedestrians and 4 or more vehicles, and a risk level of 2 can correspond to 8-9 pedestrians and 3 vehicles. The data store 106 can store a plurality of lookup tables or the like correlating numbers of objects of specific types to a specific risk level. Yet additionally or alternatively, the computer 105 can adjust the risk level based on a distance between the user and the vehicle 101. For example, if the user is beyond a distance threshold determined based on empirical testing of user walking speed toward vehicles 101, the computer 105 can adjust the risk level by 1 (e.g., from 2 to 3) to reduce operation of the sensors 110 and consume less energy.

The computer 105 can identify one or more remote sensors 310 at the user origin location. The remote sensors 310 can be mounted to infrastructure to collect data 115 at the user origin location. For example, the remote sensors 310 can include, e.g., a surveillance camera mounted to a light post, a radar mounted to a traffic light, a forward looking camera on an adjacent vehicle, etc. Upon identifying the remote sensors 310, the computer 105 can determine whether one or more of the remote sensors 310 collect a same type of data 115 as the vehicle sensors 110. The computer 105 can deactivate the sensor(s) 110 that collect the same type of data 115 as the remote sensor 310 and can request data 115 from the remote sensor 310. For example, if the remote sensor 310 is a camera, the computer 105 can deactivate a camera 110 of the vehicle 101 and request image data 115 from the remote sensor 310, reducing power consumption by the camera 110. The remote sensor can be programmed to perform object detection of the data 115 using, e.g., a conventional image-recognition algorithm, and can transmit the identified objects to the computer 105 over the network 120, reducing the computations required by the computer 105 to identify objects in the data 115.

The computer 105 can actuate a cooling component 120 to cool the computer 105 and/or an interior of a passenger cabin of the vehicle 101 and/or a propulsion 120. The cooling component 120 may typically consume more electricity than other components 120, which can reduce the state of charge more quickly in the idle mode. When the ambient temperature is above a threshold, e.g., 22° C., the interior of the vehicle 101 and/or the computer 105 can increase in temperature beyond comfort levels for users and conventional heat limits for the computer 105. To prevent the cabin and/or the computer 105 from overheating, the computer 105 can actuate the cooling component 120 while the vehicle 101 moves to the user origin location to reduce the temperature of the cabin and/or the computer 105 to a specified temperature. The specified temperature is a temperature at which the computer 105 predicts that, after temperature increases at the user origin location, the cabin and/or the computer 105 will not exceed a temperature threshold. The temperature threshold for the cabin can be a specified temperature provided by the user, e.g., 20° C. The temperature threshold for the computer 105 can be a predetermined maximum temperature determined by a manufacturer, e.g., 50° C. Alternatively or additionally, the computer 105 can actuate a heating component 120 to increase a temperature of the cabin when the predicted cabin temperature at the user arrival time is below a threshold set by the user, e.g., 18° C. Yet additionally or alternatively, the computer 105 can actuate the cooling component 120 to cool the propulsion 120 when a predicted temperature of the propulsion 120 in the idle mode, determined based on conventional thermal models and weather data, exceeds a threshold such as a predetermined maximum temperature determined by a manufacturer, e.g., 60° C.

The computer 105 can determine to actuate the cooling component 120 when the user arrival time exceeds a time threshold. That is, when the user arrival time exceeds the time threshold, the computer 105 can determine that the vehicle 101 will remain in the idle mode as the cabin and/or the computer 105 exceeds the temperature threshold. The time threshold can be determined based on conventional temperature prediction techniques that predict an amount of time required to reach a specific temperature. The time threshold can be, e.g., 10 minutes. If the user arrival time exceeds the time threshold, the computer 105 can actuate the cooling component 120 to reduce the cabin temperature and/or the computer 105 temperature while the vehicle 101 is moving to the user origin location to prevent and/or reduce actuation of the cooling component 120 in the idle mode and to reduce power consumption from the battery.

The computer 105 can predict a user cargo load and user entry time. The user cargo load is an amount, e.g., mass, number of parcels, type of object, weight, or volume, of cargo that the user intends to carry with the vehicle 101. As the user cargo load increases, the time spent at the user origin location, and thus the amount of time the vehicle 101 spends in the idle mode, increases. A user may be able to load cargo slower or faster than another user. For example, based on an ambient temperature, weather, prior cargo load time, average user cargo load time, etc., the computer 105 can predict the time required for the user to load the cargo load into the vehicle 101. The user cargo load can include a load time multiplier that is a numerical value that is multiplied by a previous determination of the user arrival time to determine the user arrival time. For example, the load time multiplier can start at 1.0 and the computer 105 can adjust the load time multiplier based on prior cargo load times for the user, e.g., if an average prior cargo load time for the user is 150 seconds and an average cargo load time for a plurality of reference users is 100 seconds, the computer 105 can determine the load time multiplier as 150/100=1.5.

The computer 105 can predict a user entry time based on, e.g., a number of users approaching the vehicle 101, a type of user approaching the vehicle 101, prior entry times of the user, etc. In this context, a "user entry time" is a time between the user arriving at the user origin location and a time when the computer 105 determines that the vehicle 101 is ready to depart with the user in the vehicle 101. The computer 105 can determine a type of user, e.g., an adult, a child, etc., and can refer to a lookup table or the like to adjust the user entry time based on the type of user. For example, upon identifying one of the users as a child, the computer 105 can increase the user entry time by, e.g., 60 seconds, to account for additional time required by specific types of users to become ready for departure, e.g., additional time required to secure a child to a child seat. In another example, the computer 105 can increase the user entry time by a predetermined amount, e.g., 120 seconds, upon identifying that the user has a motion assistance device such as a cane or a wheelchair.

The computer 105 can predict the user cargo load based on data 115 from one or more remote sensors 110. The computer 105 can use a conventional image-recognition program to identify the cargo load, e.g., a shopping bag, a shopping cart, a platform cart, boxes, etc., based on image data 115 from image sensors 110. The image-recognition program can be programmed (e.g., with a conventional machine learning program such as a trained neural network) to identify specific objects that correspond to volumes of cargo, and the computer 105 can, based on the identified object, adjust the user arrival time. For example, if image data 115 from the remote sensors 110 show that the user has a platform cart, the computer 105 can increase the user arrival time by a predetermined amount to account for the time to load the volume of cargo carried by the platform cart into the vehicle 101. In another example, if the data 115 show that the user has only one shopping bag, the computer 105 can maintain the user arrival time or increase the user arrival time by a smaller amount than for the platform cart because the user can quickly load the single shopping bag into the vehicle 101. In yet another example, the user can request a specific volume of storage space upon requesting the vehicle 101, and the computer 105 can adjust the user arrival time based on the requested volume. Example adjustments of the user arrival time based on a predicted user cargo load are shown in Table 3 below:

TABLE 3

| Predicted Cargo Load Volume | Change in User Arrival Time |
|---|---|
| One bag | 2 minutes |
| Shopping Cart | 5 minutes |
| Platform Cart | 10 minutes |

The computer 105 can identify a power station near the user origin location. At the power station, the computer 105 can receive electricity to increase the state of charge of the battery of the vehicle 101. The computer 105 can determine to move the vehicle 101 to the power station to increase the state of charge prior to meeting the user at the user arrival time. The computer 105 can determine an estimated travel time between the power station and the user origin location. For example, the computer 105 can determine the estimated travel time based on a distance from the power station to the user origin location and a speed limit on roads to the user origin location. The computer 105 can determine to move the vehicle 101 from a current location to the power station and charge the battery until a time such that, upon moving the vehicle 101 for the estimated travel time, the vehicle 101 arrives at the user origin location at the user arrival time.

The computer 105 can actuate an active mode upon arrival of the user. The "active" mode is a mode, in contrast to the idle mode, in which the computer 105 actuates components 120 to move the user from the user origin location to the user destination location. That is, in the active mode, the computer 105 reactivates components 120 that were deactivated in the idle mode. For example, the computer 105 reactivates the propulsion 120 in the active mode to move the vehicle 101 and charge the battery.

Figure 4:
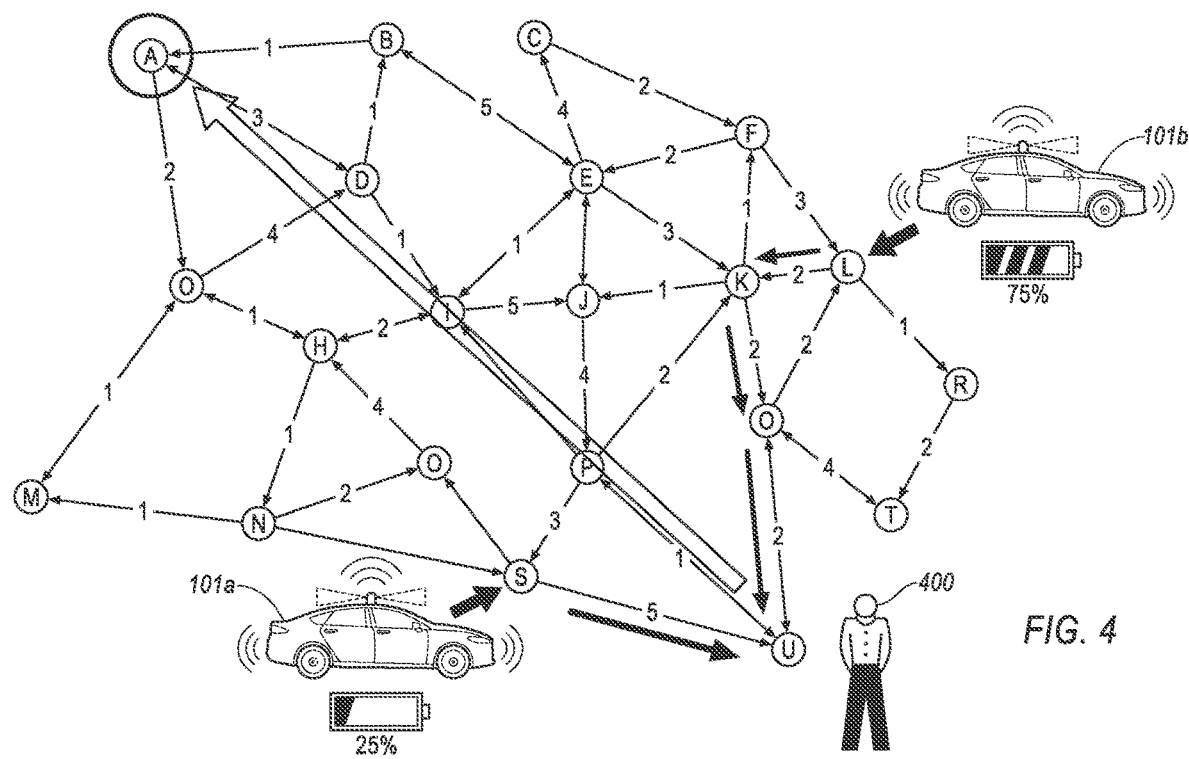
FIG. 4 is a diagram of a plurality of example routes traveled by vehicles.

As shown in FIG. 4, the server 130 can identify a vehicle 101 to move the user from the user origin location to the user destination location. The server 130 can identify a plurality of locations between which users can move. The locations are identified in FIG. 4 with the letters A-U. The server 130 can determine a charge cost between two locations. The charge cost can be determined as an amount of charge spent from moving between the locations. For example, the charge cost can increase with increasing distance between the locations. In another example, the charge cost can increase with lower speed limits that require the vehicle to spend additional time between the locations. The server 130 can assign a numerical value to the charge cost, e.g., from 1-5, with a charge cost of 1 being a lowest amount of charge spent by the battery of the vehicle 101 and a charge cost of 5 being a highest amount of charge spent by the battery of the vehicle 101. For example, the charge cost between the location S and the location U can be 5, and the charge cost between the location L and the location K can be 2.

A user 400 can request a vehicle 101 to move the user 400 from a user origin location to a user destination location, e.g., from a user origin location U to a user destination location A. FIG. 4 shows two example vehicles 101a and 101b. The vehicle 101a has a state of charge of 25%, and the vehicle 101b has a state of charge of 75%. Upon receiving the request from the user 400, the server 130 can identify the vehicles 101a and 101b and determine which vehicle 101a, 101b to send to the user 400. The server 130 can determine the vehicle 101a, 101b to send to the user 400 based on the state of charge of the vehicle 101a, 101b and the charge cost from a current location of the vehicle 101a, 101b and the user origin location. For example, the charge cost for the vehicle 101a between the location S and the location U is 5, and the total charge cost for the vehicle 101b between the location L and the location U is 6. Because the vehicle 101b has a greater state of charge, the server 130 can instruct the vehicle 101b to meet the user 400 at the user origin location U even though the charge cost to reach the user 400 is greater than for the vehicle 101a. In another example, if the server 130 predicts a user arrival time for the user 400 such that the vehicle 101a would deplete the charge from the battery while idling, the server 130 can instruct the vehicle 101b to meet the user 400 at the user origin location U so that the vehicle 101b can idle at the user origin location U until the user arrival time and have charge remaining in the battery to move the user 400 to the user destination location A. That is, the vehicle 101a, 101b loses charge from the respective battery while the vehicle 101a, 101b idles during the user arrival time, and the server 130 can identify the vehicle 101a, 101b that will have charge remaining in the battery when the user 400 arrives at the vehicle 101a, 101b at the user arrival time. The server 130 can thus remove vehicles 101 from selection that would have their respective batteries depleted upon elapsing of user arrival time determined based on, e.g., the user cargo load time and user entry time as described above.

The server 130 can identify a route for the vehicle 101a, 101b to the user origin location that actuates a combustion engine to increase the state of charge of the battery above a charge threshold upon arriving at the user origin location. That is, in a hybrid-propulsion vehicle that includes a combustion engine and a battery to propel the vehicle 101a, 101b, the combustion engine can consume fuel to increase the state of charge of the battery. Because the internal combustion engine is deactivated in the idle mode, the combustion engine can only charge the battery while the vehicle 101a, 101b is traveling to the user origin location. In another example, the computer 105 can suppress stop-start operation of the propulsion while the vehicle 101 is en route to the user origin location. That is, during stop-start operation, the computer 105 deactivates the propulsion when the vehicle 101 is stopped (e.g., at a red traffic light) and reactivates the propulsion when the vehicle 101 is required to move (e.g., at a green traffic light). By suppressing the stop-start operation, the propulsion continues to operate while the vehicle 101 is stopped, increasing the state of charge of the battery. In yet another example, the propulsion can include a flywheel that rotates upon braking, storing regenerative braking energy that can be transferred to the battery when the vehicle 101 requires movement. The computer 105 can actuate the combustion engine to rotate the flywheel prior to entering the idle mode to provide additional energy to the battery. In yet another example, the computer 105 can operate the vehicle 101 in a fuel-savings mode that reduces the amount of fuel and/or charge spent while traveling to the user origin location, preserving the state of charge of the battery upon arriving at the user origin location.

Figure 5:
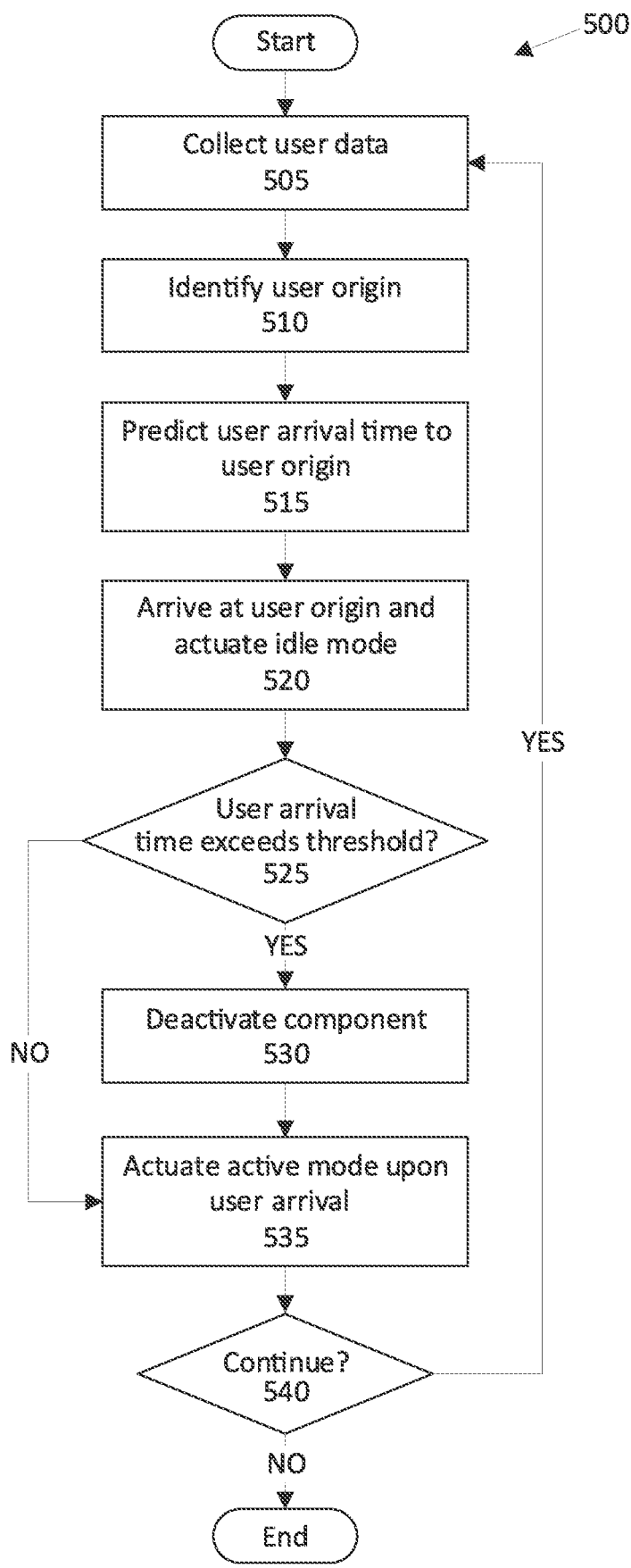
FIG. 5 is a diagram of an example process for operating to the user origin location.

FIG. 5 is a diagram of an example process 500 for operating a vehicle 101 to a user origin location. The process 500 begins in a block 505, in which the computer 105 collects data 115 about a user. For example, the computer 105 can receive a transmission of a message from a server 130 indicating user information, e.g., prior user arrival times, current user cargo load, etc.

Next, in a block 510, the computer 105 identifies the user origin location. The message from the server 130 can include geo-coordinates of a location selected by the user as the user origin location. Alternatively or additionally, the computer 105 can communicate with the user over the network 125 to identify the location at which the user selects to meet the vehicle 101.

Next, in a block 515, the computer 105 predicts a user arrival time to the user origin location. As described above, the computer 105 can predict the user arrival time based on, e.g., prior user arrival times, weather data 115 at the user origin location, a user cargo load, a distance from a current user location and the user origin location, etc.

Next, in a block 520, the vehicle 101 arrives at the user origin location and the computer 105 actuates an idle mode for the vehicle 101. As described above, in the idle mode, the computer 105 deactivates a propulsion 120 and operates the components 120 with the vehicle 101 battery. Because the vehicle 101 is stopped at the user origin location, the idle mode stops consumption of liquid fuel and emissions resulting from the combustion of the liquid fuel.

Next, in a block 525, the computer 105 determines whether the user arrival time (or, time to arrival) exceeds a threshold. As described above, if the user arrival time exceeds the threshold, the battery can be depleted prior to the user arrival time ending and the user arriving at the user origin location. That is, the threshold can be determined as an amount of time until the state of charge of the battery reaches a charge threshold, e.g., 0%, 10%, etc. The charge threshold can be an amount of charge required to reactivate the propulsion 120 and/or an amount of charge to prevent degradation of the battery. If the user arrival time exceeds the threshold, the process 500 continues in a block 530. Otherwise, the process 500 continues in a block 535.

In the block 530, the computer 105 deactivates one or more components 120 to reduce power consumption of the battery. For example, the computer 105 can deactivate one or more sensors 110 having ranges away from the user origin location, as described above. In another example, the computer 105 can reduce computations performed by the sensor 110, e.g., by reducing a data 115 collection rate of the sensors 110.

In the block 535, the computer 105 actuates an active mode upon user arrival at the user origin location. As described above, in the active mode, the computer 105 actuates the propulsion 120, e.g., an internal combustion engine, and reactivates the components 120 deactivated in the idle mode.

Next, in a block 540, the computer 105 determines whether to continue the process 500 For example, the computer 105 can determine not to continue when, upon dropping off the user at the user destination location, the computer 105 determines that the vehicle 101 requires additional fuel. If the computer 105 determines to continue, the process 500 returns to the block 505 to collect more data 115. Otherwise, the process 500 ends.

Figure 6:
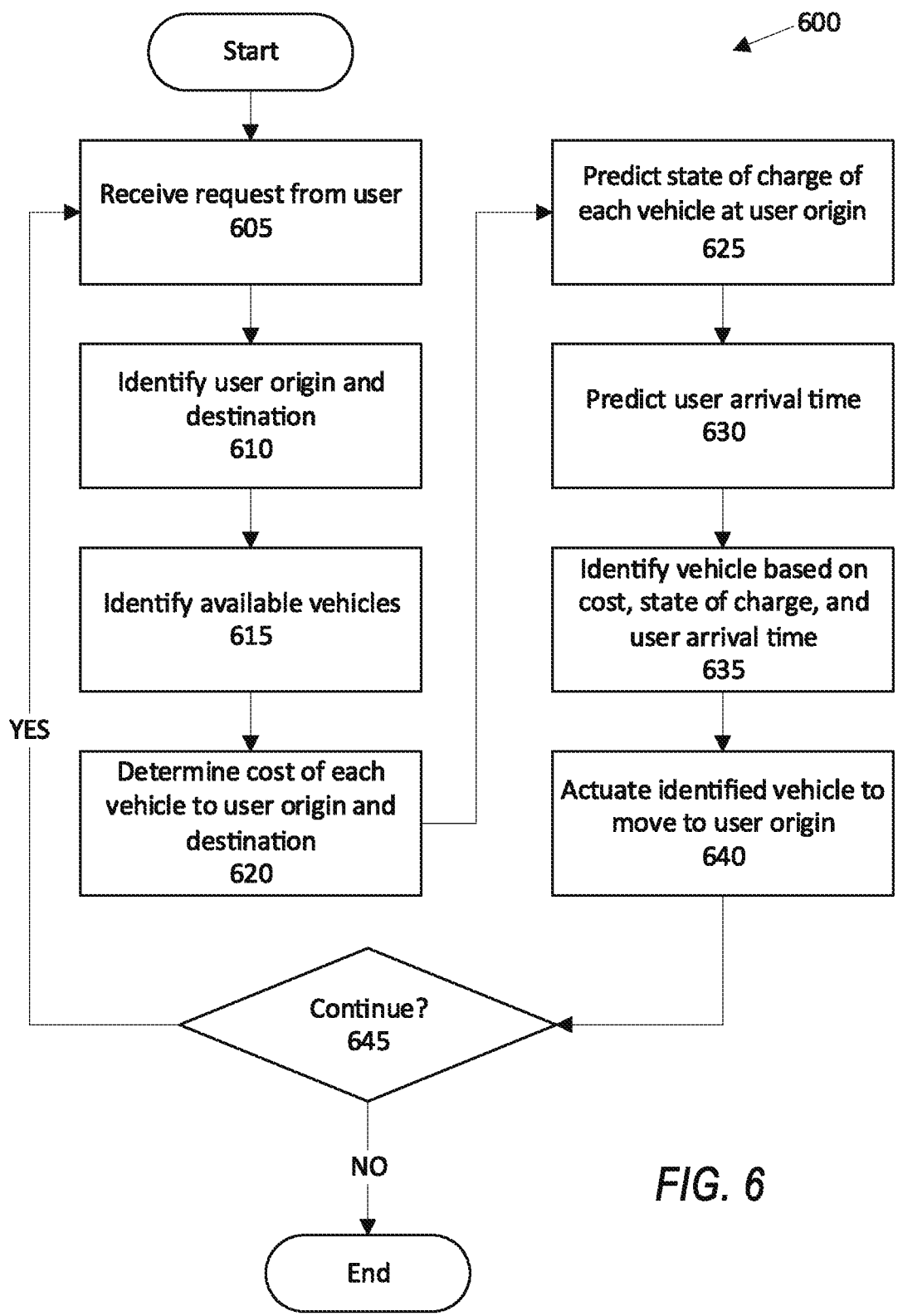
FIG. 6 is a diagram of an example process for identifying a vehicle to move the user from the user origin location to a user destination location.

FIG. 6 is a diagram of an example process 600 for identifying a vehicle 101 to transport a user from a user origin location to a user destination location. The process 600 begins in a block 605, in which a server 130 receives a request from a user. The server 130 can receive the request over the network 125 from, e.g., a portable device of the user.

Next, in a block 610, the server 130 identifies a user origin location and a user destination location. The request can include geo-coordinates of the user origin location and the user destination location. Alternatively, the server 130 can determine the user origin location as a predetermined location (e.g., a transportation station) closest to the user, and can determine the user destination as a predetermined location closest to an end location (e.g. a restaurant, a store, a landmark, etc.) selected by the user.

Next, in a block 615, the server 130 identifies available vehicles 101 to transport the user. For example, as shown in FIG. 4 and described above, the server 130 can identify two vehicles 101a, 101b not currently transporting users near the user. The vehicles 101 can communicate with the server 130 when the vehicles 101 are available for transportation.

Next, in a block 620, the server 130 determines a charge cost for each vehicle 101 to move from a current vehicle 101 location to the user origin location and then to the user destination location. As described above, the server 130 can determine the charge cost as a predicted amount of fuel consumed and charge spent to move the vehicle 101 to the user origin location, idle at the user origin location while waiting for the user, and then transport the user to the user destination location. The server 130 can determine the charge cost based on a distance between the current vehicle 101 location and the user origin location, traffic data that may delay the vehicle 101 and cause the vehicle 101 to consume additional fuel, etc.

Next, in a block 625, the server 130 predicts a state of charge of a battery for each vehicle 101 upon arrival at the user origin location. Each computer 105 of each vehicle 101 can transmit a message over the network 125 indicating a current state of charge of its respective battery. Based on the charge cost and the current state of charge, the server 130 can predict the remaining state of charge of each vehicle 101 upon arriving at the user origin location.

Next, in a block 630, the server 130 predicts a user arrival time. As described above, the server 130 can predict the user arrival time based on, e.g., prior user arrival times, weather data 115 at the user origin location, a user cargo load, a distance from a current user location and the user origin location, a predicted user entry time, etc.

Next, in a block 635, the server 130 identifies a vehicle 101 based on the predicted cost, state of charge, and the user arrival time. The server 130 can identify a vehicle 101 that, upon idling at the user origin location until the user arrival time expires, will still have enough charge to actuate the active mode and transport the user from the user origin location to the user destination location.

Next, in a block 640, the server 130 actuates the identified vehicle 101 to move to the user origin location to transport the user to the user destination location. The server 130 can instruct the computer 105 of the identified vehicle 101 to actuate a propulsion 120 to move the vehicle 101 to the user origin location and then to move to the user destination location upon collecting the user.

Next, in a block 645, the server 130 determines whether to continue the process 600. For example, the server 130 can determine to continue the process 600 if there are vehicles 101 waiting for assignments to transport users. If the server 130 determines to continue, the process 600 returns to the block 605. Otherwise, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Intercal, Java™ C, C++, Visual Basic, CoffeScript, TypeScript, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to: predict a user arrival time based on data of a user and a user origin location, the user arrival time being a predicted time at which the user will arrive at the user origin location after requesting a vehicle; deactivate a propulsion of the vehicle upon arriving at the user origin location; reduce operation of one or more additional vehicle components powered by a vehicle battery based on the predicted user arrival time; and deactivate one or more sensors having a data collection range exceeding a distance threshold from the vehicle when the user arrival time exceeds a time threshold.

2. The system of claim 1, wherein the instructions further include instructions to reduce a data collection rate of one or more sensors from a default collection rate to a reduced collection rate based on the user arrival time and to collect data with the one or more sensors at the reduced collection rate.

3. The system of claim 1, wherein the instructions further include instructions to predict a state of charge of a battery of the vehicle at the user arrival time and to deactivate one or more components based on the predicted state of charge.

4. The system of claim 1, wherein the instructions further include instructions to identify a user destination location and to assign one of a plurality of vehicles to transport the user from the user origin location to the user destination location based on the user arrival time.

5. The system of claim 1, wherein the instructions further include instructions to identify a remote sensor and a type of data collected by the remote sensor and to deactivate one or more sensors that collect the same type of data.

6. The system of claim 1, wherein the instructions further include instructions to identify a number of objects within a distance threshold of the vehicle and to deactivate the one or more components when the number of objects is below a threshold.

7. The system of claim 1, wherein the instructions further incltude instructions to identify a route for the vehicle to the user origin location that actuates a combtustion engine to increase a state of charge of a battery above a charge threshold upon arriving at the user origin location.

8. The system of claim 1, wherein the instructions further include instructions to predict the user arrival time based on previous user arrival times for the user.

9. The system of claim 1, wherein the instructions further include instructions to determine the user arrival time based on weather data at the user origin location.

10. The system of claim 1, wherein the instructions further include instructions to determine the user arrival time based on a type of facility located at the user origin location.

11. The system of claim 1, wherein the instructions further include instructions to identify a user cargo load and to predict the user arrival time based on the user cargo load.

12. The system of claim 1, wherein the instructions further include instructions to suppress deactivation of the propulsion when the vehicle is stopped en route to the user origin location.

13. The system of claim 1, wherein the instructions further include instructions to determine the user arrival time based on a number of users requested to be transported.

14. The system of claim 1, wherein the instructions further include instructions to provide power to one or more vehicle components on a vehicle power network having a wire with a lower resistance than a second wire in a second vehicle power network.

15. The system of claim 1, wherein the instructions further include instructions to predict the user arrival time based on a predicted user entry time.

16. A method, comprising: predicting a user arrival time based on data of a user and a user origin location, the user arrival time being a predicted time at which the user will arrive at the user origin location after requesting a vehicle; deactivating a propulsion of the vehicle upon arriving at the user origin location; reducing operation of one or more additional vehicle components powered by a vehicle battery based on the predicted user arrival time; and deactivating one or more sensors having a data collection range exceeding a distance threshold from the vehicle.

17. A system, comprising: a vehicle component powered by a vehicle battery; means for predicting a user arrival time based on data of a user and a user origin location, the user arrival time being a predicted time at which the user will arrive at the user origin location after requesting a vehicle; means for deactivating a propulsion of the vehicle upon arriving at the user origin location; means for reducing operation of the vehicle component based on the user arrival time; and means for deactivating one or more sensors having a data collection range exceeding a distance threshold from the vehicle.

* * * * *

UNITED STATES PATENT AND TRADEMARK OFFICE
CERTIFICATE OF CORRECTION

PATENT NO. : 11,281,217 B2
APPLICATION NO. : 16/452122
DATED : March 22, 2022
INVENTOR(S) : Herman et al.

It is certified that error appears in the above-identified patent and that said Letters Patent is hereby corrected as shown below:

In the Claims

Column 17, Claim 7, Line 27: Replace "incltude" with --include--

Column 17, Claim 7, Line 28: Replace "combtustion" with --combustion--

Signed and Sealed this
Seventeenth Day of May, 2022

Katherine Kelly Vidal
*Director of the United States Patent and Trademark Office*